(12) United States Patent
Chang et al.

(10) Patent No.: US 11,688,862 B2
(45) Date of Patent: Jun. 27, 2023

(54) AIR-COOLING FUEL CELL STACK

(71) Applicant: Industrial Technology Research Institute, Hsinchu (TW)

(72) Inventors: Sung-Chun Chang, Hsinchu (TW); Chien-Ming Lai, Hsinchu County (TW); Chiu-Ping Huang, Taoyuan (TW); Keng-Yang Chen, Hsinchu County (TW); Li-Duan Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 15 days.

(21) Appl. No.: 17/496,788

(22) Filed: Oct. 8, 2021

(65) Prior Publication Data

US 2022/0200018 A1  Jun. 23, 2022

(30) Foreign Application Priority Data

Dec. 22, 2020 (TW) ................................ 109145454

(51) Int. Cl.
*H01M 8/04* (2016.01)
*H01M 8/0273* (2016.01)
(Continued)

(52) U.S. Cl.
CPC ......... *H01M 8/0273* (2013.01); *H01M 8/028* (2013.01); *H01M 8/0267* (2013.01); *H01M 8/1004* (2013.01)

(58) Field of Classification Search
CPC .. H01M 8/0273; H01M 8/0267; H01M 8/028; H01M 8/1004
See application file for complete search history.

(56) References Cited

U.S. PATENT DOCUMENTS 6,231,053 B1   5/2001  Wakamatsu
6,649,097 B2  11/2003  Sasaki et al.
(Continued)

FOREIGN PATENT DOCUMENTS

CN        1268021      8/2006
JP      2001336640    12/2001
(Continued)

OTHER PUBLICATIONS

"Office Action of Japan Counterpart Application", dated Nov. 29, 2022, p. 1-p. 3.
(Continued)

*Primary Examiner* — Olatunji A Godo
(74) *Attorney, Agent, or Firm* — JCIPRNET

(57) ABSTRACT

An air-cooling fuel cell stack includes fuel cells, wherein each of the fuel cells includes an anode bipolar plate, a cathode bipolar plate, a membrane electrode assembly (MEA) between the anode and cathode bipolar plates, and an anode sealing member. The MEA includes an anode side structure, a cathode side structure, and an ion conductive membrane (ICM), and the ICM is sandwiched between the anode side structure and the cathode side structure. The anode sealing member is disposed at a periphery of the anode side structure and sandwiched by the anode bipolar plate and the ICM. The anode sealing member includes a first sealing material and a second sealing material, a Shore hardness of the first sealing material is different from that of the second sealing material, and an arrangement direction of the first and second sealing materials is perpendicular to a compression direction of the plurality of fuel cells.

16 Claims, 4 Drawing Sheets

(51) Int. Cl.
*H01M 8/028* (2016.01)
*H01M 8/1004* (2016.01)
*H01M 8/0267* (2016.01)

(56) References Cited

U.S. PATENT DOCUMENTS

| | | |
|---|---|---|
| 8,197,990 B2 | 6/2012 | Burdzy et al. |
| 8,455,152 B2 | 6/2013 | Stanic |
| 9,240,598 B2 | 1/2016 | Martin et al. |
| 9,985,301 B2 | 5/2018 | Cole et al. |
| 2009/0246586 A1 | 10/2009 | Kawabata et al. |
| 2014/0308599 A1* | 10/2014 | Jeong ............. H01M 8/0284 429/510 |

FOREIGN PATENT DOCUMENTS

| | | |
|---|---|---|
| JP | 2008176941 | 7/2008 |
| TW | 200520284 | 6/2005 |
| TW | 200947792 | 11/2009 |

OTHER PUBLICATIONS

"Office Action of Taiwan Counterpart Application", dated May 10, 2021, p. 1-p. 4.

\* cited by examiner

AIR-COOLING FUEL CELL STACK

CROSS-REFERENCE TO RELATED APPLICATION

This application claims the priority benefit of Taiwan application serial no. 109145454, filed on Dec. 22, 2020. The entirety of the above-mentioned patent application is hereby incorporated by reference herein and made a part of this specification.

TECHNICAL FIELD

The disclosure relates to an air-cooling fuel cell stack.

BACKGROUND

The traditional air-cooling fuel cell stack is formed by a plurality of fuel cells, and the bipolar plate of each of the fuel cells is provided with both a reaction channel and a heat dissipation channel. In order to avoid issues such as the interconnection of anode fuel and cathode fuel and fuel leakage, an elastic sealing material is usually used to seal the outer edge of the reaction area of the fuel cell.

However, during the compression assembly process, the inconsistency of pressure/torsion or structural defects (such as missing corners at the edge of the electrode plate) may cause variations in electrode thickness/amount of compression. Once the thickness/amount of compression of each of the fuel cells is different, the issue of inconsistency in the amount of compression of each of the fuel cells occurs, thus affecting the power generation performance.

SUMMARY

An air-cooling fuel cell stack of the disclosure includes a plurality of fuel cells. Each of the fuel cells includes an anode bipolar plate, a cathode bipolar plate, a membrane electrode assembly, an anode sealing member, and a cathode sealing member. The membrane electrode assembly is located between the anode bipolar plate and the cathode bipolar plate, wherein the membrane electrode assembly includes an anode side structure, a cathode side structure, and an ion conductive membrane, and the ion conductive membrane is sandwiched between the anode side structure and the cathode side structure. The anode sealing member is disposed at a periphery of the anode side structure and sandwiched by the anode bipolar plate and the ion conductive membrane. The anode sealing member includes a first sealing material and a second sealing material, a Shore hardness of the first sealing material is different from a Shore hardness of the second sealing material, and an arrangement direction of the first sealing material and the second sealing material is perpendicular to a compression direction of the plurality of fuel cells.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In the following, exemplary embodiments of the disclosure are comprehensively described with reference to figures, but the disclosure may also be implemented in various different forms and should not be construed as limited to the embodiments of the specification. In the figures, for clarity, the size and thickness of each region, portion, and layer do not need to be shown to actual scale.

The disclosure provides an air-cooling fuel cell stack that may ensure the consistency of power generation and prevent issues such as reduced utilization rate and safety caused by fuel leakage.

Figure 1:
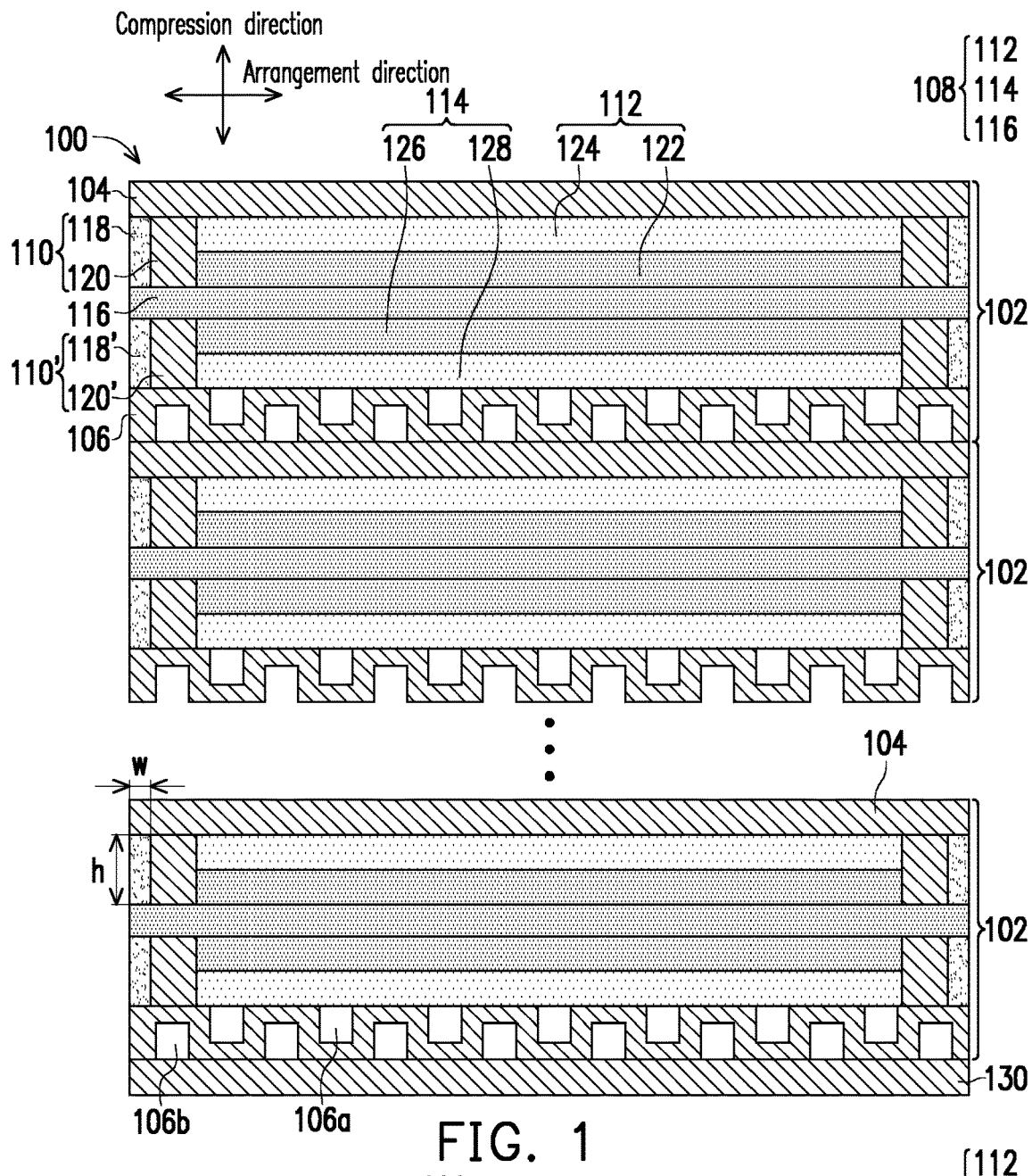
FIG. 1 is a cross-sectional view of an air-cooling fuel cell stack according to the first embodiment of the disclosure.

FIG. 1 is a cross-sectional view of an air-cooling fuel cell stack according to the first embodiment of the disclosure.

Referring to FIG. 1, an air-cooling fuel cell stack 100 of the first embodiment includes a plurality of fuel cells (also called "cells") 102, and the plurality of fuel cells 102 are electrically and structurally combined in series or in parallel to form a stack. Each of the fuel cells 102 includes an anode bipolar plate 104, a cathode bipolar plate 106, a membrane electrode assembly 108, an anode sealing member 110, and a cathode sealing member 110'. The membrane electrode assembly 108 is located between the anode bipolar plate 104 and the cathode bipolar plate 106, wherein the membrane electrode assembly 108 includes an anode side structure 112, a cathode side structure 114, and an ion conductive membrane 116. The ion conductive membrane 116 is sandwiched between the anode side structure 112 and the cathode side structure 114. In the present embodiment, the plane area of the anode bipolar plate 104 and the plane area of the cathode bipolar plate 106 are both substantially the same as the plane area of the ion conductive membrane 116, and the plane area of the anode side structure 112 and the plane area of the cathode side structure 114 are both less than the plane area of the ion conductive membrane 116. Therefore, the anode sealing member 110 is disposed at the periphery of the anode side structure 112 and sandwiched by the anode bipolar plate 104 and the ion conductive membrane 116. Specifically, the anode sealing member 110 is disposed at the periphery of the anode side structure 112, so that the sum plane area of the anode side structure 112 and the anode sealing member 110 is substantially the same as the plane area of the anode bipolar plate 104, the plane area of the cathode bipolar plate 106, and the plane area of the ion conductive membrane 116 respectively. In particular, the anode sealing member 110 includes a first sealing material 118 and a second sealing material 120. The first sealing material 118 and the second sealing material 120 are substantially materials with different elasticities. For example, the Shore hardness of the first sealing material 118 is different from the Shore hardness of the second sealing material 120, and the arrangement direction of the first sealing material 118 and the second sealing material 120 is perpendicular to the compression direction of the fuel cells 102. Since FIG. 1 is a cross-sectional view, the anode sealing member 110 is shown at both sides of the anode side structure 112. However, it should be understood that the air-cooling fuel cell stack 100 is generally a rectangular sheet-shaped assembly structure, so the anode sealing member 110 actually seals the anode side structure 112 along the entire periphery of the anode side structure 112.

Please continue to refer to FIG. 1. The second sealing material 120 in the present embodiment is interposed between the first sealing material 118 and the anode side structure 112, that is, the first sealing material 118 covers the periphery of the second sealing material 120, and the second sealing material 120 is located on the inside. The Shore hardness of the first sealing material 118, for example, is less than or equal to A70. In an embodiment, the first sealing material 118 may have a Young's modulus less than or equal to 0.2 GPa. Therefore, during the assembly of the air-cooling fuel cell stack 100, the air tightness of each of the fuel cells 102 (battery cells) may be maintained, so as to prevent fuel leakage causing reduced utilization rate and safety issues. The Shore hardness of the second sealing material 120, for example, is more than or equal to A90, so the thickness thereof is not changed before and after assembly, and the amount of thickness compression of each of the fuel cells 102 (battery cells) may be fixed to ensure the consistency of the power generation of each of the fuel cells 102. The material of the first sealing material 118 may be exemplified but not limited to rubber or silicone, and the material of the second sealing material 120 may be exemplified but not limited to metal, plastic, or ceramic. In addition, from the perspective of air tightness, the ratio of a width w of the first sealing material 118 to a height h of the second sealing material 120 (that is, the expected height after the first sealing material 118 is compressed) is more than or about 20%, and in the first embodiment, the ratio of the width w of the first sealing material 118 to the height h of the second sealing material 120 is more than or equal to 30%.

The air-cooling fuel cell stack 100 may adopt direct air cooling or indirect air cooling. In an embodiment, when the air-cooling fuel cell stack 100 adopts direct air cooling for a power generating reaction, the sealability of the anode side directly affects the performance of the fuel cells 102 at this time, so the anode sealing member 110 of the disclosure may be used to prevent fuel leakage. The open design of the cathode side has no special requirements for the sealability, so there is no limit to whether the cathode side needs to be provided with an elastic sealing member. However, in another embodiment, when the air-cooling fuel cell stack 100 adopts indirect air cooling for a power generating reaction, there are requirements for the sealability of the cathode side, and similar sealing members may also be used to achieve the airtight effect. See the following description for details.

Please refer to FIG. 1, each of the fuel cells 102 may further include the cathode sealing member 110'. The cathode sealing member 110' is disposed at the periphery of the cathode side structure 114 and sandwiched by the cathode bipolar plate 106 and the ion conductive membrane 116. Specifically, the cathode sealing member 110' is disposed at the periphery of the cathode side structure 114, so that the sum plane area of the cathode side structure 114 and the cathode sealing member 110' is substantially the same as the plane area of the anode bipolar plate 104, the plane area of the cathode bipolar plate 106, and the plane area of the ion conductive membrane 116 respectively. In particular, the cathode sealing member 110' includes a third sealing material 118' and a fourth sealing material 120'. The third sealing material 118' and the fourth sealing material 120' are substantially materials with different elasticities. For example, the Shore hardness of the third sealing material 118' is different from the Shore hardness of the fourth sealing material 120', and the arrangement direction of the third sealing material 118' and the fourth sealing material 120' is perpendicular to the compression direction of the fuel cells 102. Since FIG. 1 is a cross-sectional view, the cathode sealing member 110' is shown at both sides of the cathode side structure 114. However, it should be understood that the air-cooling fuel cell stack 100 is generally a rectangular sheet-shaped assembly structure, so the cathode sealing member 110' actually seals the cathode side structure 114 along the entire periphery of the cathode side structure 114.

The fourth sealing material 120' in the present embodiment is interposed between the third sealing material 118' and the cathode side structure 114, that is, the third sealing material 118' covers the periphery of the fourth sealing material 120', and the fourth sealing material 120' is located on the inside. In particular, the third sealing material 118' may adopt a material with the same characteristics as the first sealing material 118 of the anode sealing member 110, and the fourth sealing material 120' may adopt a material with the same characteristics as the second sealing material 120 of the anode sealing member 110, the characteristics and material types of which are as provided above and are not repeated herein.

In the membrane electrode assembly 108 of the first embodiment, the anode side structure 112 may include an anode electrode layer 122 and an anode gas diffusion layer 124, and the anode gas diffusion layer 124 is in contact with the anode bipolar plate 104. The cathode side structure 114 may include a cathode electrode layer 126 and a cathode gas diffusion layer 128, and the cathode gas diffusion layer 128 is in contact with the cathode bipolar plate 106. In one embodiment, the anode electrode layer 122 and the cathode electrode layer 126 are respectively formed by a nanoparticle catalyst, an ion conductive polymer, and a high surface area activated carbon carrier. The nanoparticle catalyst is distributed on the surface of the activated carbon carrier and is connected to the ion conductive polymer in a certain structure to form a reactive structure. The anode gas diffusion layer 124 and the cathode gas diffusion layer 128 are respectively formed by a porous material, usually a porous three-dimensional structure with mechanical strength formed by a highly conductive carbon fiber and a resin binder, so as to allow the gas/liquid fuels and products to enter and exit the membrane electrode assembly 108 during power generation, and to maintain a certain degree of conductivity, that is, to ensure smooth mass transfer of the three-phase reactants/products. In addition to carbon-based materials such as carbon paper/carbon cloth/carbon felt, the anode gas diffusion layer 124 and the cathode gas diffusion layer 128 may also be formed by other conductive porous materials, such as metal foam or metal mesh. Moreover, since the air-cooling fuel cell stack 100 is cooled by gas, the cathode bipolar plate 106 generally has a reaction channel 106a and a heat dissipation channel 106b with complementary shapes. The reaction channel 106a allows a reaction gas to flow, and the heat dissipation channel 106b has a flowing gas for removing the heat generated by each of the fuel cells 102 (battery cells). The anode bipolar plate 104 and the cathode bipolar plate 106 are formed by conductive materials, which may be a single or composite material. The design of the reaction channel 106a and the heat dissipation channel 106b has a variety of forms such as snake-shaped, straight-through, partitioned, and grid-shaped. In addition, the assembled air-cooling fuel cell stack 100 may adopt an end plate 130 to make the whole combination more stable.

Figure 2:
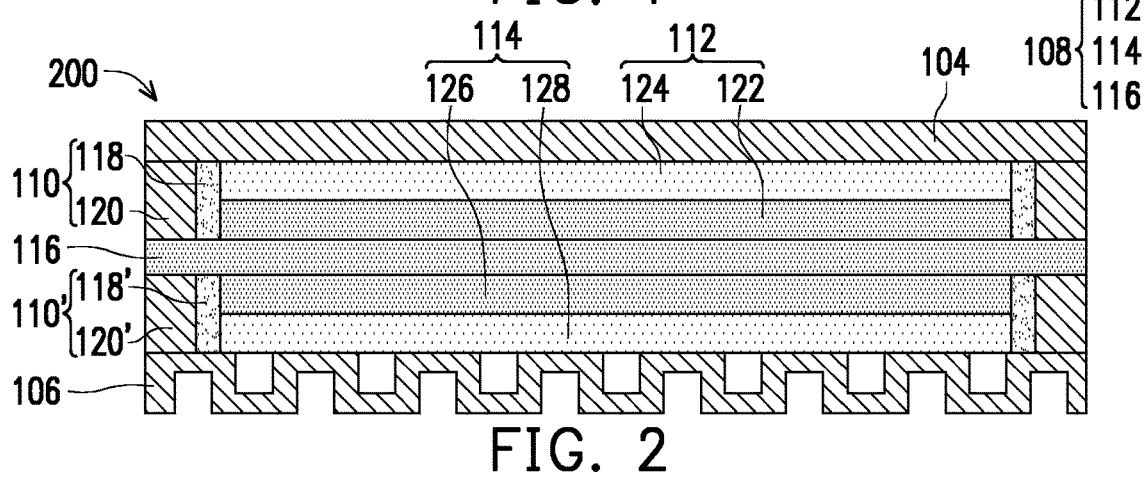
FIG. 2 is a cross-sectional view of an air-cooling fuel cell stack according to the second embodiment of the disclosure.

FIG. 2 is a cross-sectional view of an air-cooling fuel cell stack according to the second embodiment of the disclosure. The same reference numerals as in the first embodiment are used to represent the same or similar members, and the content of the same or similar members is as provided in the relevant description of the first embodiment and is not repeated herein.

Please refer to FIG. 2, the air-cooling fuel cell stack structure of the second embodiment is similar to that of FIG. 1, so one single fuel cell 200 (i.e., battery cell) is shown alone. It is noted that, in the fuel cell 200 of the present embodiment, the first sealing material 118 of the anode sealing member 110 is interposed between the second sealing material 120 and the anode side structure 112. That is, the second sealing material 120 covers the periphery of the first sealing material 118, and the first sealing material 118 is located on the inside. The third sealing material 118' of the cathode sealing member 110' is interposed between the fourth sealing material 120' and the cathode side structure 114. That is, the fourth sealing material 120' covers the periphery of the third sealing material 118', and the third sealing material 118' is located on the inside. The arrangement of the anode sealing member 110 and the cathode sealing member 110' may also maintain the air tightness of each of the battery cells, and may fix the amount of thickness compression of each of the battery cells to ensure the consistency of the power generation of each of the fuel cells 102.

In the embodiment of FIG. 2, the first sealing material 118 and the third sealing material 118' with similar characteristics are both located on the inside, and the second sealing material 120 and the fourth sealing material 120' with similar characteristics both cover the periphery. However, in other embodiments, different arrangement orders may also be adopted. For example, the first sealing material 118 and the fourth sealing material 120' are both located on the inside, and respectively in contact with the anode side structure 112 and the cathode side structure 114. The second sealing material 120 and the third sealing material 118' are located on the periphery, respectively covering the first sealing material 118 and the fourth sealing material 120', the air tightness of each of the battery cells may also be maintained, and the disclosure is not limited to the examples provided.

Figure 3A:
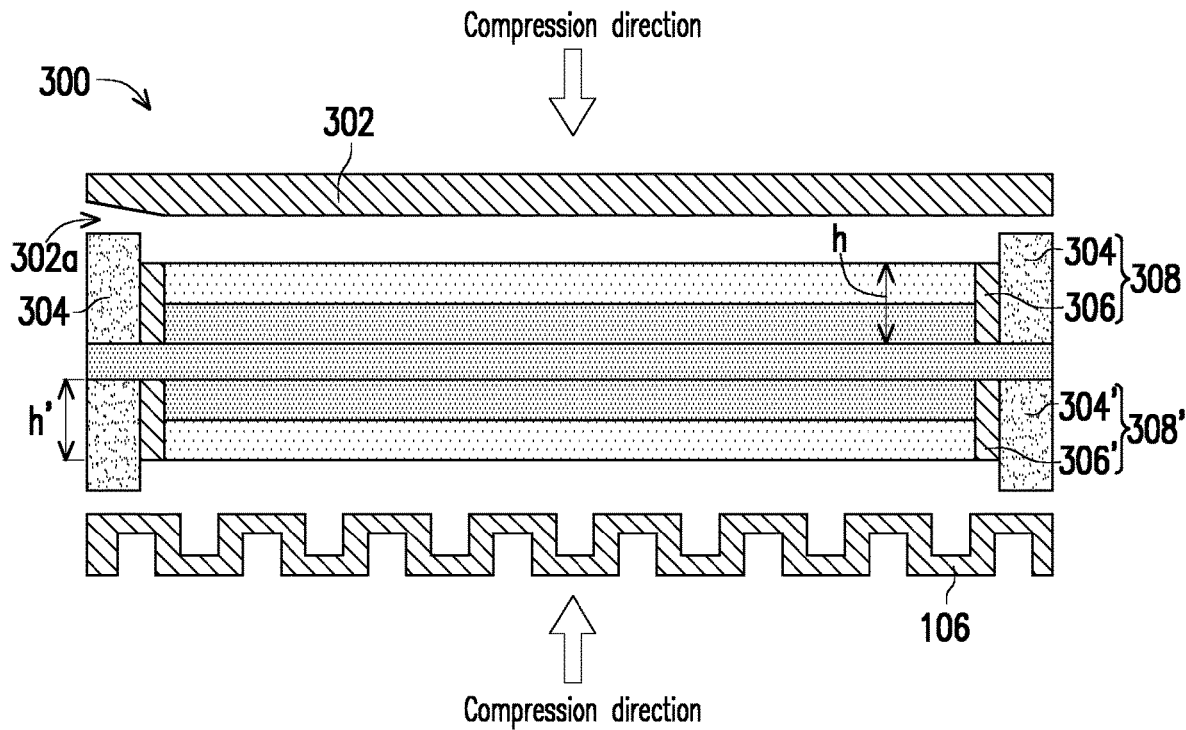
FIG. 3A is a cross-sectional view of an air-cooling fuel cell stack before assembly according to the third embodiment of the disclosure.
Figure 3B:
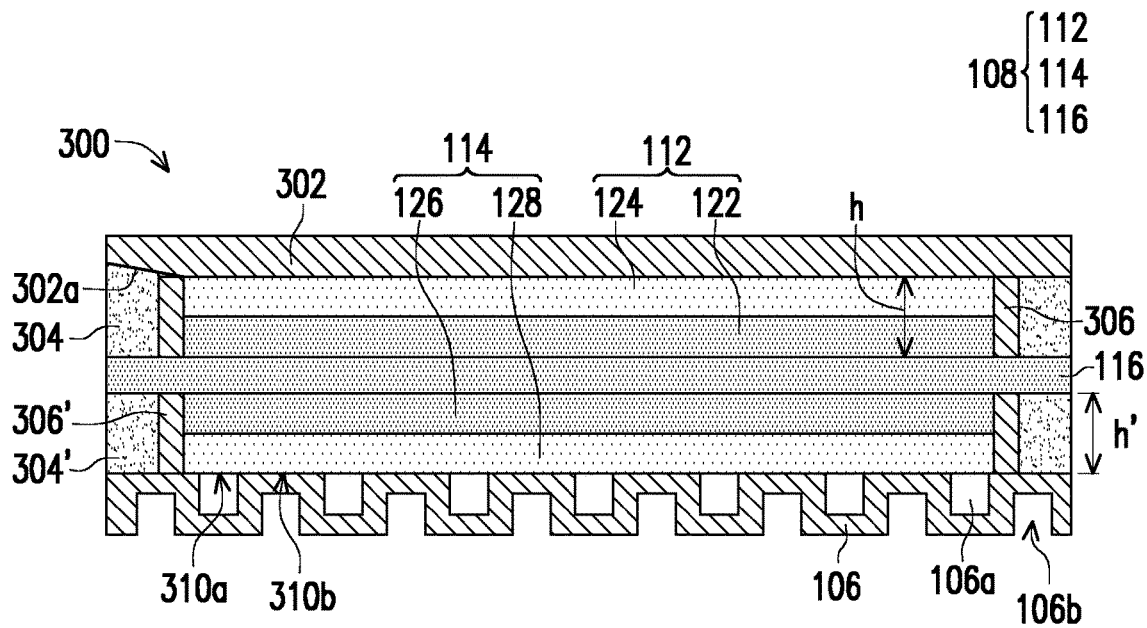
FIG. 3B is a cross-sectional view of the air-cooling fuel cell stack of FIG. 3A after assembly.

FIG. 3A and FIG. 3B are cross-sectional views of an air-cooling fuel cell stack before and after assembly according to the third embodiment of the disclosure. The same reference numerals as in the first embodiment are used to represent the same or similar members, and the content of the same or similar members is as provided in the relevant description of the first embodiment and is not repeated herein.

Please refer first to FIG. 3A, the air-cooling fuel cell stack structure of the third embodiment is similar to that of FIG. 1, so one single fuel cell 300 (i.e., battery cell) is shown alone. Assuming that an anode bipolar plate 302 of the fuel cell 300 is a bipolar plate with a defect 302a at the edge, an anode sealing member 308 formed by a first sealing material 304 and a second sealing material 306 is used. The arrangement direction of the first sealing material 304 and the second sealing material 306 is perpendicular to the compression direction of the fuel cell 300, and the arrangement position of the first sealing material 304 is correspondingly in contact with the defect 302a. The Shore hardness of the first sealing material 304, for example, is less than or equal to A70, or in another embodiment, the first sealing material 304 has a Young's modulus less than or equal to 0.2 GPa. The Shore hardness of the second sealing material 306, for example, is more than or equal to A90. The height of the first sealing material 304 before assembly may be greater than the height h of the second sealing material 306, and the height h of the second sealing material 306 is a predetermined height, such as the thickness of the anode side structure 112 after the fuel cell 300 is compressed. In an embodiment, a cathode sealing member 308' formed by a third sealing material 304' and a fourth sealing material 306' is used. The arrangement direction of the third sealing material 304' and the fourth sealing material 306' is perpendicular to the compression direction of the fuel cell 300. The third sealing material 304' adopts a material with the same characteristics as the first sealing material 304, and the fourth sealing material 306' adopts a material with the same characteristics as the second sealing material 306. The height of the third sealing material 304' before assembly may be greater than a height h' of the fourth sealing material 306', and the height h' of the fourth sealing material 306' is a predetermined height, such as the thickness of the cathode side structure 114 after the fuel cell 300 is compressed.

Then, referring to FIG. 3B, the assembled first sealing material 304 is filled to the position of the defect 302a of the anode bipolar plate 302 to fill the gap, so as to ensure the air tightness of the anode end of the fuel cell 300, and prevent fuel leakage causing reduced utilization rate and safety issues. The second sealing material 306 may fix the thickness of the anode side structure 112 after the fuel cell 300 is compressed. At the same time, in the present embodiment, the third sealing material 304' may be compressed to have the same height as the fourth sealing material 306' to ensure the air tightness of the cathode end of the fuel cell 300. In particular, after the cathode bipolar plate 106 with the reaction channel 106a and the heat dissipation channel 106b is compressed and assembled, if a general sealing material that is easy to compress is used, due to different parts (for example, parts 310a and 310b) being subjected to different forces, the amount of compression of the membrane electrode assembly 108 at different positions may not be fixed, resulting in lower power generation performance. At this time, the fourth sealing material 306' with greater hardness and less deformability is directly in contact with the cathode bipolar plate 106. Therefore, the thickness of the membrane electrode assembly 108 of the fuel cell 300 after compression and assembly is equal to the sum of the height h of the second sealing material 306 and the height h' of the fourth sealing material 306' (i.e., h+h') plus the thickness of the ion conductive membrane 116. As a result, a single fuel cell 300 may have the same thickness after compression to ensure that the power generation of each of the fuel cells 300 is consistent.

Figure 4:
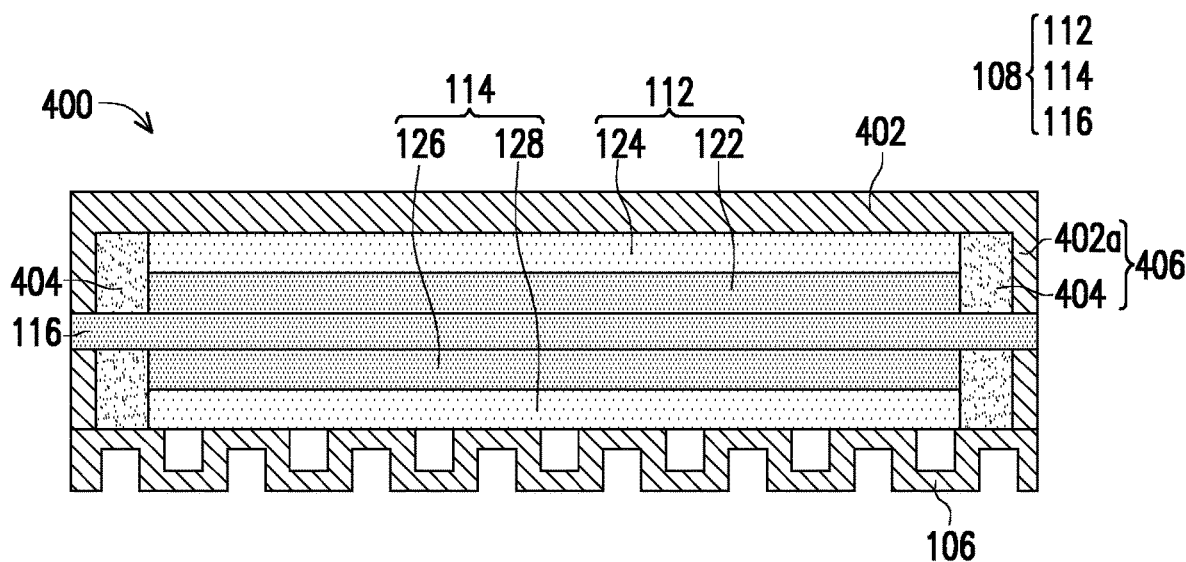
FIG. 4 is a cross-sectional view of an air-cooling fuel cell stack according to the fourth embodiment of the disclosure.

FIG. 4 is a cross-sectional view of an air-cooling fuel cell stack according to the fourth embodiment of the disclosure. The same reference numerals as in the second embodiment are used to represent the same or similar members, and the content of the same or similar members is as provided in the relevant description of the second embodiment and is not repeated herein.

Please refer to FIG. 4, which shows one individual fuel cell 400 (i.e., battery cell), so the air-cooling fuel cell stack structure of the fourth embodiment is similar to FIG. 1 in that it is formed by a plurality of fuel cells 400. It should be noted that, in the fuel cell 400, the material of an anode bipolar plate 402 and the material of a second sealing material 402a are the same (for example, metal). In the present embodiment, the second sealing material 402a and the anode bipolar plate 402 may be an integral structure; that is, the second sealing material 402a is equivalent to an extension structure of the anode bipolar plate 402. A first sealing material 404 in an anode sealing member 406 is interposed between the second sealing material 402a and the anode side structure 112.

Figure 5:
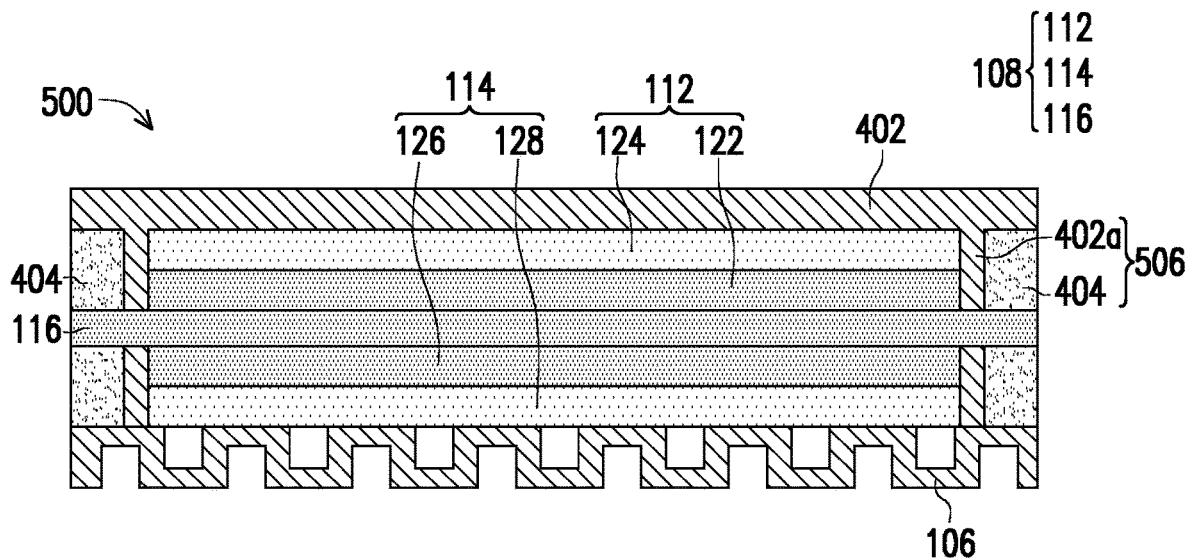
FIG. 5 is a cross-sectional view of an air-cooling fuel cell stack according to the fifth embodiment of the disclosure.

However, the disclosure is not limited thereto. In a case in which the second sealing material 402a and the anode bipolar plate 402 are an integral structure and made of the same material, the positions of the first sealing material 404 and the second sealing material 402a may be interchanged. Please further refer to FIG. 5. A fuel cell 500 of the fifth embodiment is similar to the fuel cell 400 of FIG. 4. It should be mentioned that, in the fuel cell 500, the first sealing material 404 in an anode sealing member 506 is disposed on the outside, and the second sealing material 402a formed integrally with the anode bipolar plate 402 and made of the same material is interposed between the first sealing material 404 and the anode side structure 112.

Figure 6:
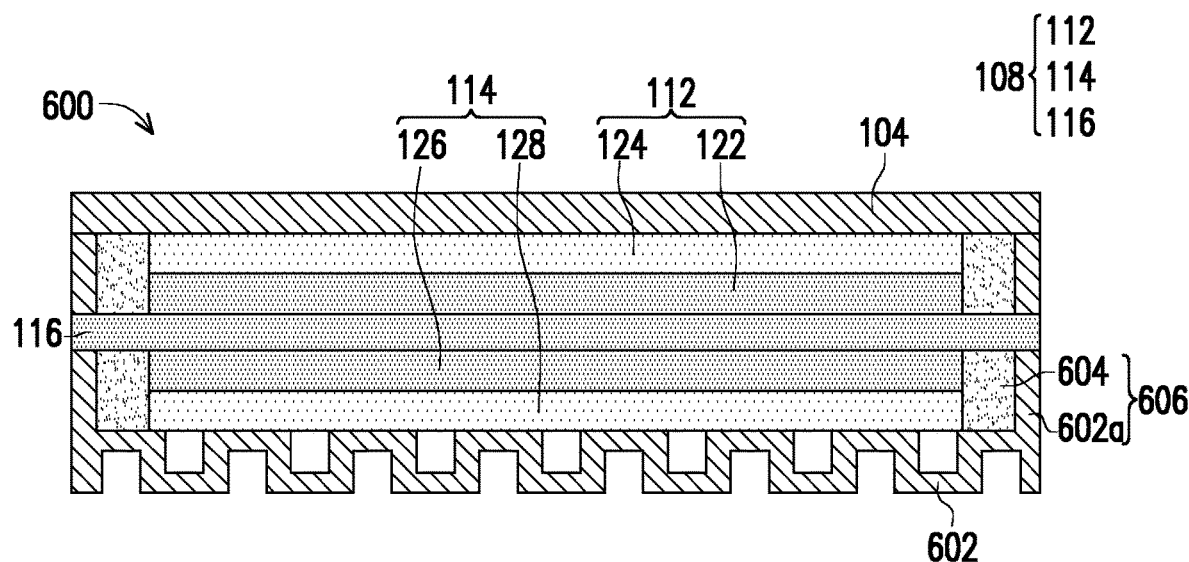
FIG. 6 is a cross-sectional view of an air-cooling fuel cell stack according to the sixth embodiment of the disclosure.

Please refer to FIG. 6, the material of a fourth sealing material 602a in a cathode sealing member 606 may also be the same as the material of a cathode bipolar plate 602. In an embodiment, the fourth sealing material 602a and the cathode bipolar plate 602 may be an integral structure. A third sealing material 604 in the cathode sealing member 606 is interposed between the fourth sealing material 602a and the cathode side structure 114.

Figure 7:
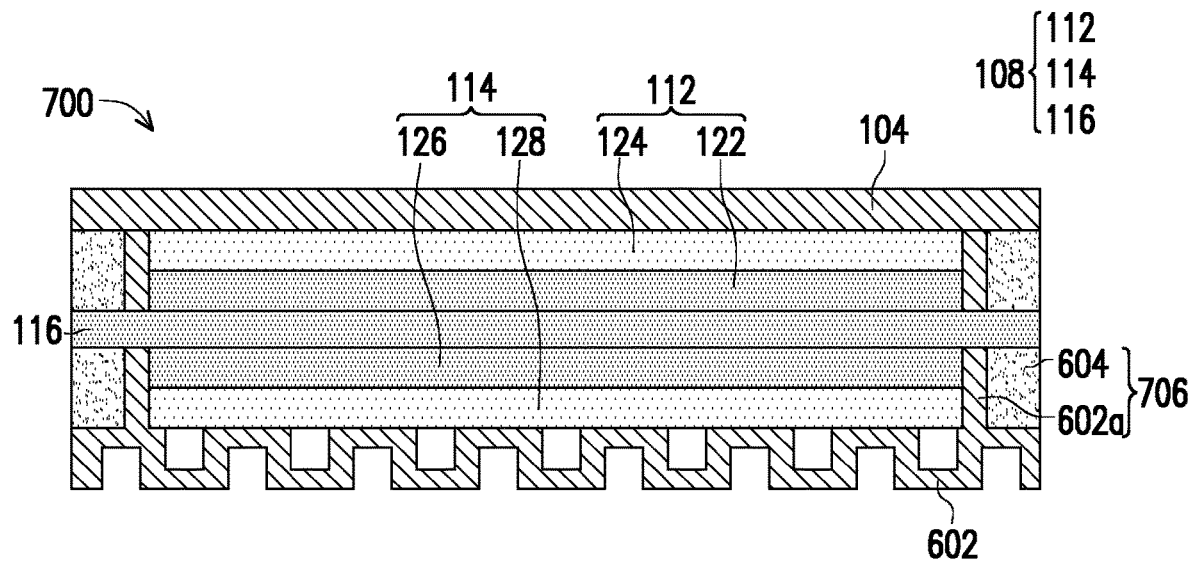
FIG. 7 is a cross-sectional view of an air-cooling fuel cell stack according to the seventh embodiment of the disclosure.

Moreover, in a case in which the fourth sealing material 602a and the cathode bipolar plate 602 are an integral structure and made of the same material, the positions of the third sealing material 604 and the fourth sealing material 602a may be interchanged. Please further refer to FIG. 7. A fuel cell 700 of the seventh embodiment is similar to the fuel cell 600 of FIG. 6. It should be mentioned that, in the fuel cell 700, the third sealing material 604 in a cathode sealing member 706 is disposed on the outside, and the fourth sealing material 602a formed integrally with the cathode bipolar plate 602 and made of the same material is interposed between the third sealing material 604 and the cathode side structure 114.

Several experiments are provided below to verify the efficacy of the disclosure. However, the disclosure is not limited to the following content.

Experimental Example

The air-cooling fuel cell stack 100 formed by 10 fuel cells 102 (battery cells) as shown in FIG. 1 was assembled, wherein the Shore hardness of the first sealing material 118 in the anode sealing member 110 was A30, and the Young's modulus thereof was 0.1 GPa; and the average Shore hardness of the second sealing material 120 was A90. Since this Experimental example was a direct air-cooling fuel cell, the cathode side was an open channel, and there was no airtight issue. Therefore, a material that is harder to compress may be used for the cathode side, with a Shore hardness of A90, so as to maintain the thickness of the cathode side structure 114. In the stack formed by 10 fuel cells, the active area of each of the fuel cells was about 45 $cm^2$, and the thickness of the anode sealing member after compression was about 500 micrometers. After being fully activated, hydrogen gas was introduced into the anode, and air was introduced into the cathode to measure the amount of air leakage at the anode, and discharged was performed at a constant voltage of 6.5 V for 120 minutes to measure the current value during the discharge thereof. The results are shown in Table 1 below.

Comparative Example 1

The same air-cooling fuel cell stack as the Experimental example was assembled, but the anode sealing member in the Experimental example was changed to the second sealing material in Comparative example 1. The stack was then tested as in the Experimental example, and the results are shown in Table 1 below.

Comparative Example 2

The same air-cooling fuel cell stack as the Experimental example was assembled, but the anode sealing member in the Experimental example was changed to the first sealing material in Comparative example 2. The stack was then tested as in the Experimental example, and the results are shown in Table 1 below.

Comparative Example 3

The same air-cooling fuel cell stack as the Experimental example was assembled, and the anode sealing member adopted all the same materials as the Experimental example, except that the arrangement direction of the first sealing material and the second sealing material was different from the Experimental example. The arrangement direction of the first sealing material and the second sealing material in Comparative example 3 was parallel to the compression direction of the fuel cells. This means that the first sealing material and the second sealing material were stacked on top of each other, and simultaneously covered the periphery of the anode side structure. In particular, the thickness of the first sealing material was 50 micrometers. The stack was then tested as in the Experimental example, and the results are shown in Table 1 below.

TABLE 1

|  | Experimental example | Comparative example 1 | Comparative example 2 | Comparative example 3 |
| --- | --- | --- | --- | --- |
| Output (current) | 30 A | 30 A | <21 A | <24 A |
| Amount of fuel leakage | 0 L/min | >5 L/min | 0 L/min | 0 L/min |

From Table 1 above, it may be obtained that the air tightness of the Experimental example was the best, and the output current value thereof was also high. In Comparative example 1, although the stack had a good output current and may achieve the effect of consistent power generation of each of the fuel cells, there was still the issue of fuel leakage. In Comparative example 2, although the airtight effect may be achieved, the inconsistent amount of compression of each of the fuel cells resulted in inconsistent power generation of each of the fuel cells, thus resulting in unstable output current of the stack. In Comparative example 3, although the same anode sealing member was used, since the arrangement direction of the first sealing material and the second sealing material was parallel to the compression direction, the air tightness effect may be achieved, but the issue of inconsistent amount of compression of the fuel cells may not be completely solved, and there was still the situation in which the power generation of each of the fuel cells was inconsistent.

Based on the above, in the disclosure, the sealing members designed with a specific structure are formed by an elastic sealing material that is easier to compress and a sealing material that is harder to compress. The two sealing materials are arranged at the periphery of the membrane electrode assembly perpendicular to the compression direction, and are sandwiched by the anode bipolar plate and the cathode bipolar plate. The sealing material that is harder to compress is responsible for fixing the amount of thickness compression of each of the battery cells to ensure the consistency of power generation. The elastic sealing material that is easier to compress is responsible for maintaining the air tightness of each of the battery cells to prevent fuel leakage causing reduced utilization rate and safety issues.

Based on the above, the air-cooling fuel cell stack of the disclosure is designed with airtight members to fix the amount of thickness compression of each of the battery cells to ensure the consistency of power generation and also to improve the air tightness of the battery cells, thus preventing fuel leakage causing reduced utilization rate and safety issues.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An air-cooling fuel cell stack, comprising a plurality of fuel cells, wherein each of the fuel cells comprises:
    an anode bipolar plate;
    a cathode bipolar plate;
    a membrane electrode assembly located between the anode bipolar plate and the cathode bipolar plate, wherein the membrane electrode assembly comprises an anode side structure, a cathode side structure, and an ion conductive membrane, and the ion conductive membrane is sandwiched between the anode side structure and the cathode side structure;
    an anode sealing member disposed at a periphery of the anode side structure and sandwiched by the anode bipolar plate and the ion conductive membrane; and
    a cathode sealing member disposed at a periphery of the cathode side structure and sandwiched by the cathode bipolar plate and the ion conductive membrane, wherein
    the anode sealing member comprises a first sealing material and a second sealing material, the first sealing material and the second sealing material have the same height after the fuel cells are compressed, a Shore hardness of the first sealing material is different from a Shore hardness of the second sealing material, and an arrangement direction of the first sealing material and the second sealing material is perpendicular to a compression direction of the plurality of fuel cells.

2. The air-cooling fuel cell stack of claim 1, wherein the first sealing material is interposed between the second sealing material and the anode side structure.

3. The air-cooling fuel cell stack of claim 1, wherein the second sealing material is interposed between the first sealing material and the anode side structure.

4. The air-cooling fuel cell stack of claim 1, wherein the Shore hardness of the first sealing material is less than or equal to A70, and the Shore hardness of the second sealing material is more than or equal to A90.

5. The air-cooling fuel cell stack of claim 1, wherein a Young's modulus of the first sealing material is less than or equal to 0.2 GPa.

6. The air-cooling fuel cell stack of claim 1, wherein the second sealing material and the anode bipolar plate are made of a same material.

7. The air-cooling fuel cell stack of claim 6, wherein the second sealing material and the anode bipolar plate are an integral structure.

8. The air-cooling fuel cell stack of claim 1, wherein a ratio of a width of the first sealing material to a height of the second sealing material is more than or equal to 20%.

9. The air-cooling fuel cell stack of claim 1, wherein
    the cathode sealing member comprises a third sealing material and a fourth sealing material, a Shore hardness of the third sealing material is different from a Shore hardness of the fourth sealing material, and an arrangement direction of the third sealing material and the fourth sealing material is perpendicular to the compression direction of the plurality of fuel cells.

10. The air-cooling fuel cell stack of claim 9, wherein the third sealing material is interposed between the fourth sealing material and the cathode side structure.

11. The air-cooling fuel cell stack of claim 9, wherein the fourth sealing material is interposed between the third sealing material and the cathode side structure.

12. The air-cooling fuel cell stack of claim 9, wherein the Shore hardness of the third sealing material is less than or equal to A70, and the Shore hardness of the fourth sealing material is more than or equal to A90.

13. The air-cooling fuel cell stack of claim 9, wherein a Young's modulus of the third sealing material is less than or equal to 0.2 GPa.

14. The air-cooling fuel cell stack of claim 9, wherein the fourth sealing material and the cathode bipolar plate are made of a same material.

15. The air-cooling fuel cell stack of claim 14, wherein the fourth sealing material and the cathode bipolar plate are an integral structure.

16. The air-cooling fuel cell stack of claim 9, wherein a ratio of a width of the third sealing material to a height of the fourth sealing material is more than or equal to 20%.

* * * * *